Dec. 1, 1970  K. E. MORAN ET AL  3,543,342
CONTINUOUS INJECTION MOLDING AND FILLING APPARATUS
Original Filed Jan. 16, 1967  10 Sheets-Sheet 9

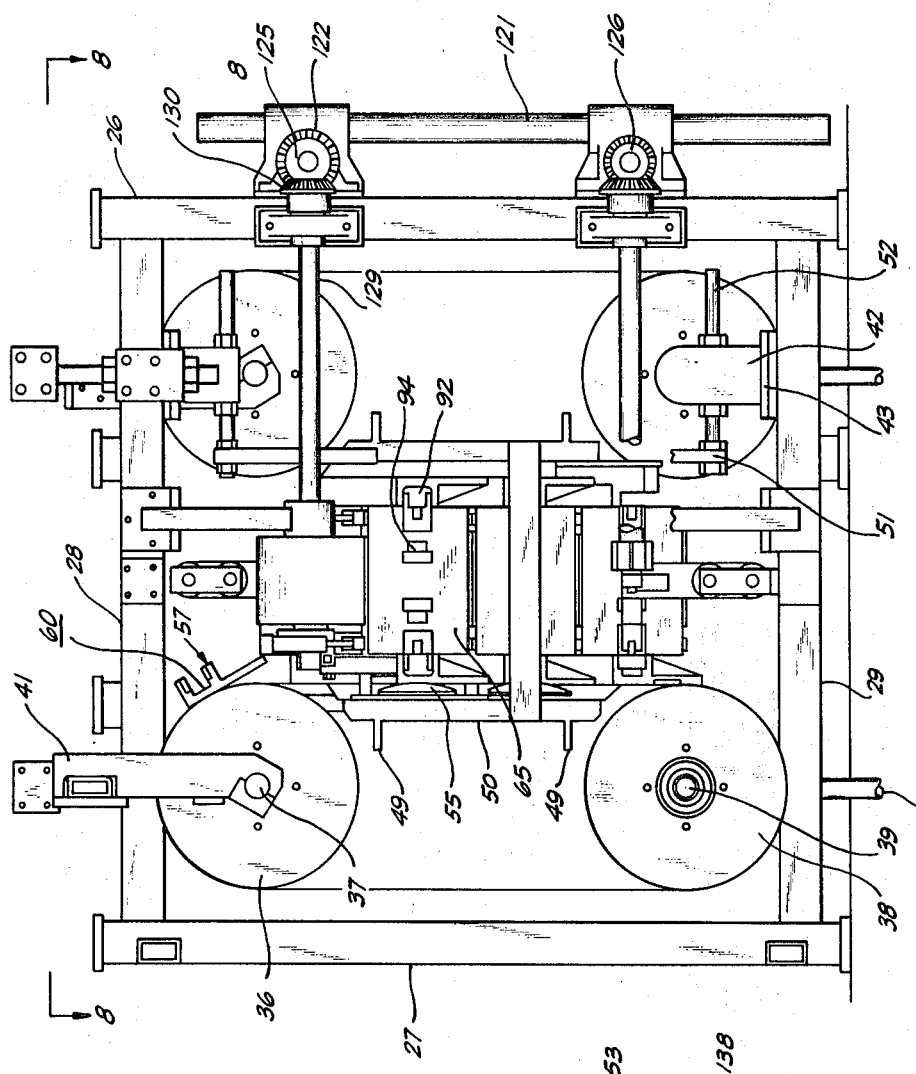
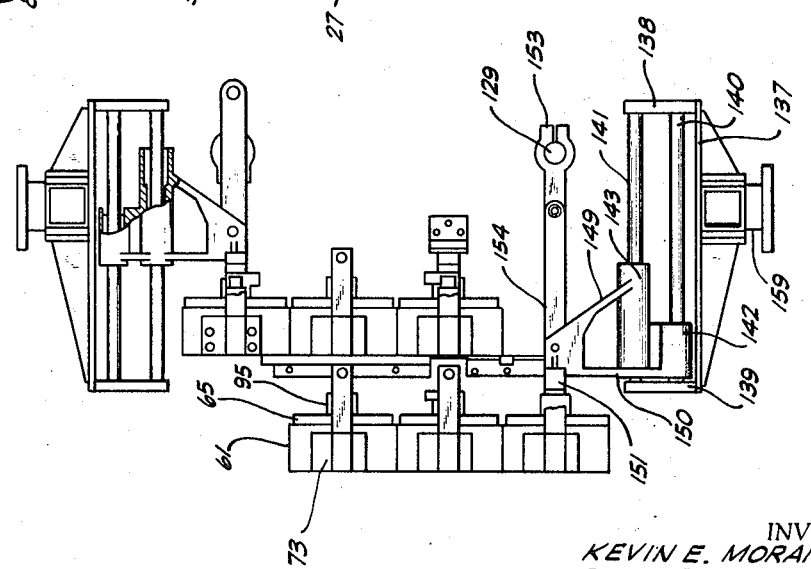

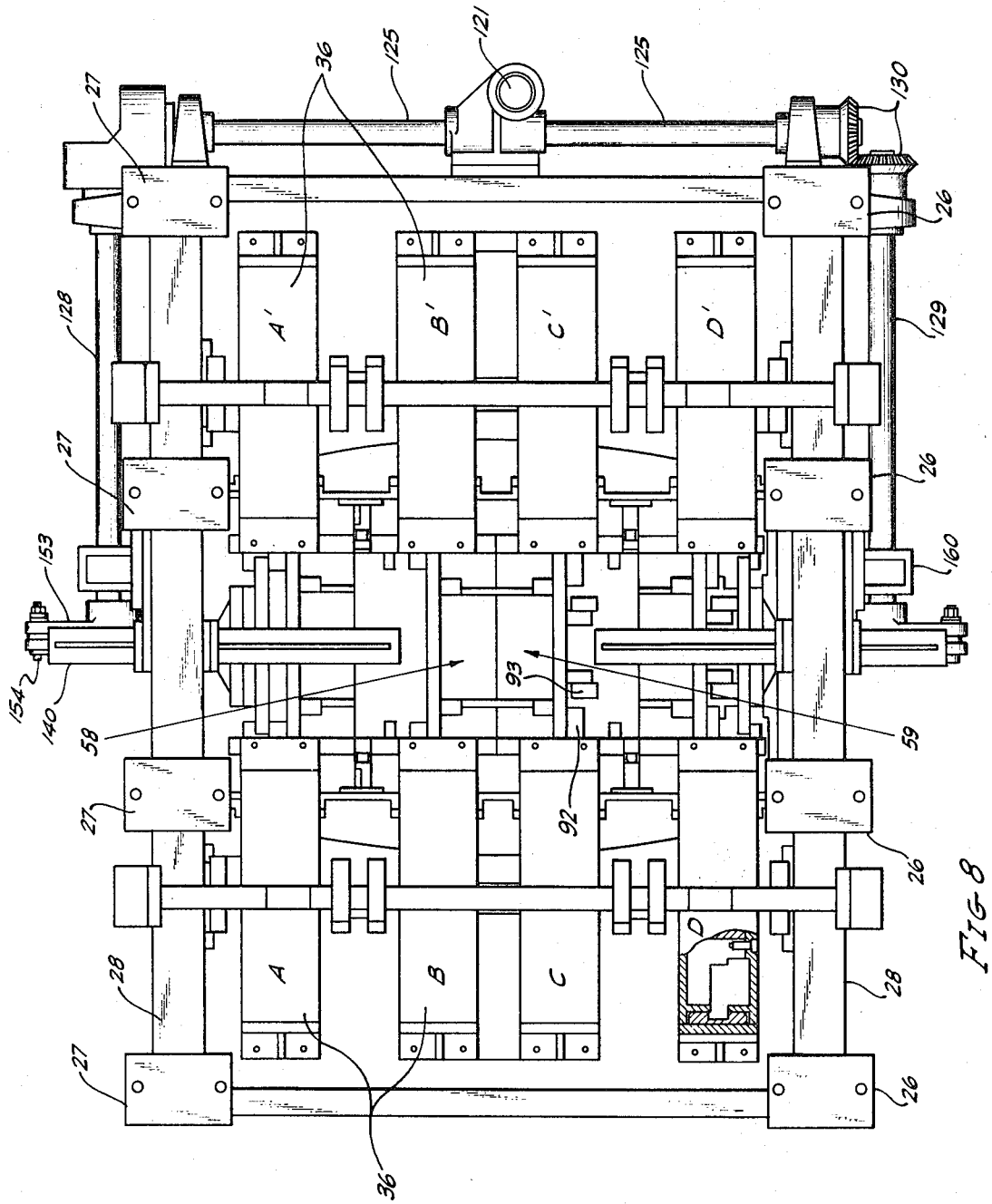

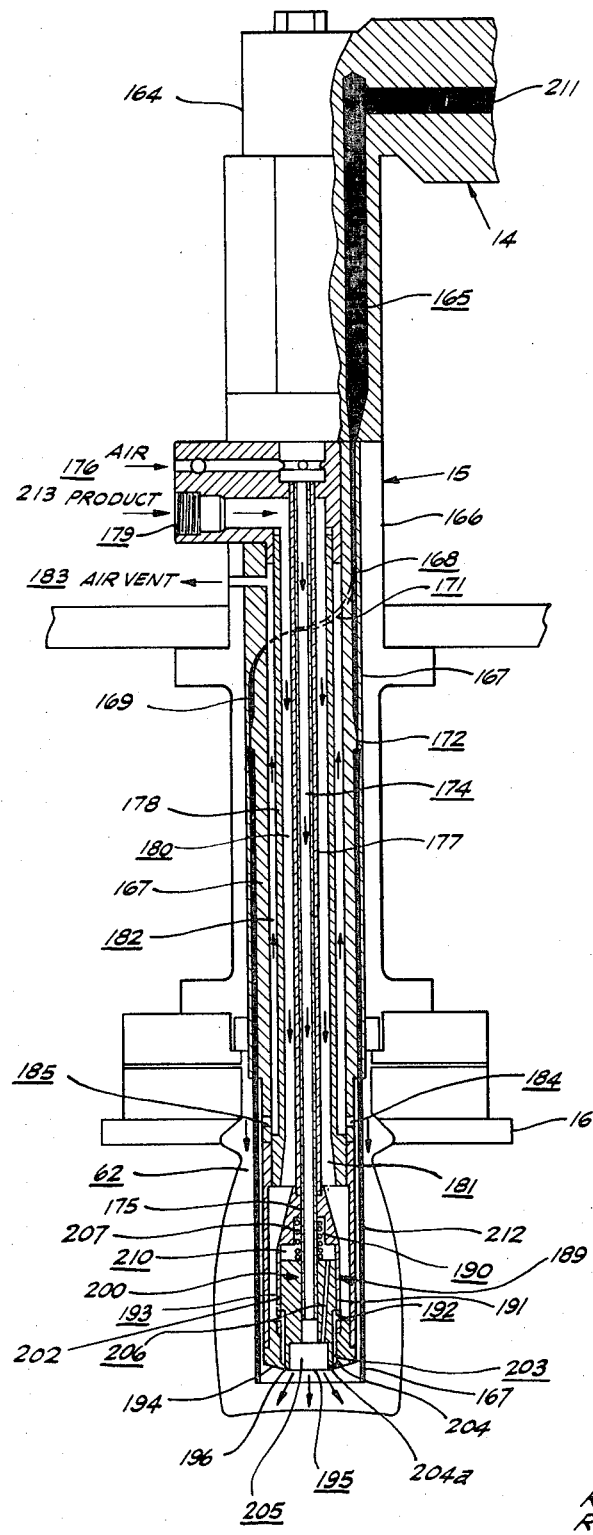

INVENTORS
KEVIN E. MORAN
ROBERT J. BROWN
BY
Milton W. Lee
ATTORNEY

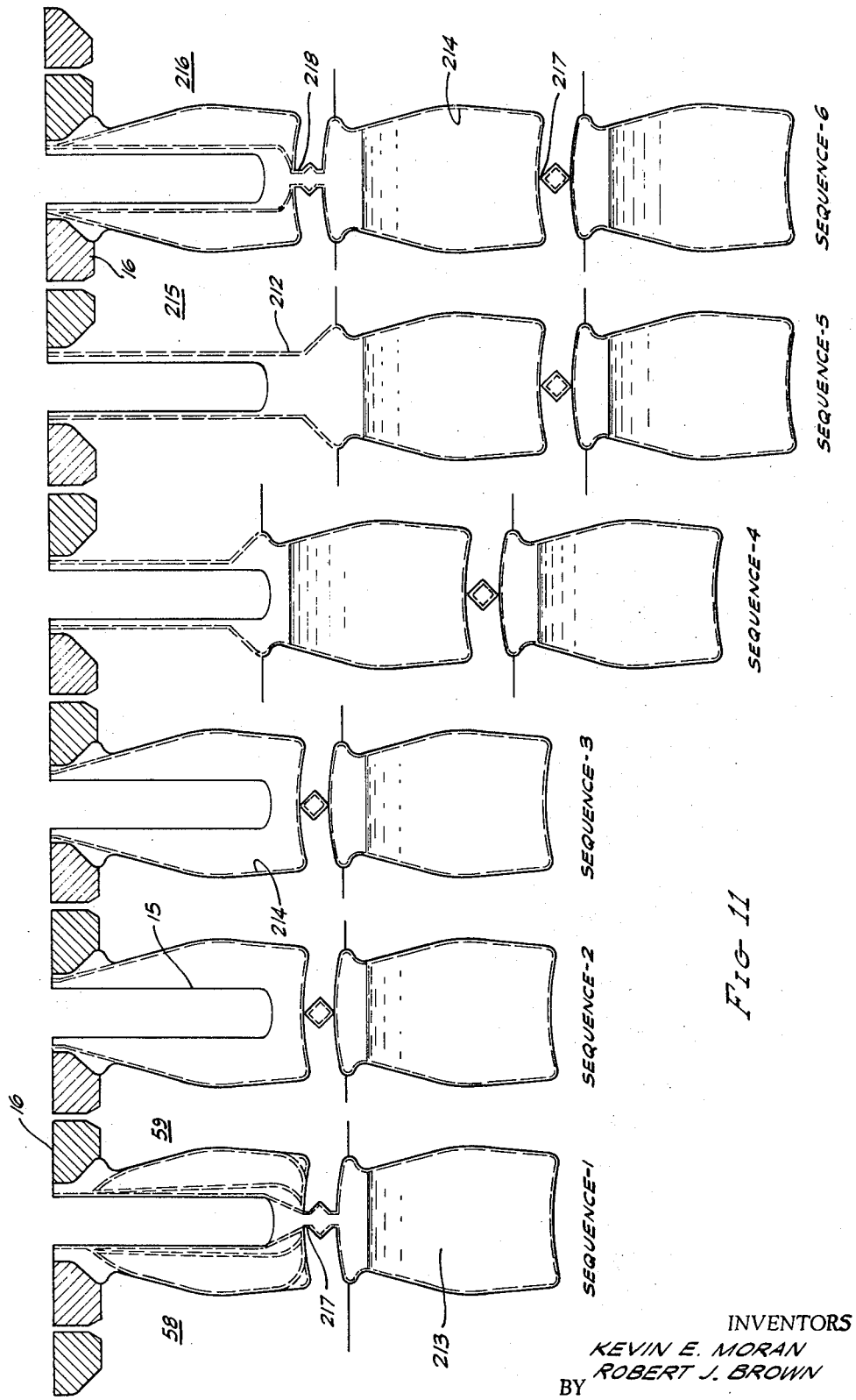

United States Patent Office 3,543,342
Patented Dec. 1, 1970

3,543,342
CONTINUOUS INJECTION MOLDING AND FILLING APPARATUS
Kevin E. Moran, Cumberland, Md., and Robert J. Brown, Des Plaines, Ill., assignors to Union Oil Company of California, Los Angeles, Calif., a corporation of California
Continuation of application Ser. No. 609,593, Jan. 16, 1967. This application Feb. 7, 1969, Ser. No. 800,347
Int. Cl. B29d 23/03
U.S. Cl. 18—5                    5 Claims

ABSTRACT OF THE DISCLOSURE

Apparatus for the continuous blow molding and filling of plastic containers comprising a vertical extrusion and filling nozzle, and disposed therebelow an endless conveyer mechanism for moving paired mold halves in separate rectangular paths, first uniting them by horizontally opposed movement around the end of the nozzle to receive the parison, then moving the united halves downwardly while filling the enclosed container, then separating them horizontally to release the filled container, then moving the separated halves vertically upwardly in parallel paths to be again united around the nozzle.

---

This is a continuation of application Ser. No. 609,593, filed Jan. 16, 1967, and now abandoned.

This invention relates to a plastic parison molding apparatus and process for filling containers, and more specifically to an apparatus which forms a container and fills it in one operation.

Various processes are known for vacuum and pressure forming a heavy wall plastic container of polyethylene, polypropylene, etc., and then subsequently filling the container with the material to be packaged. Basically these processes involve a two stage operation and necessitate separate facilities for container making and filling. This is costly from the standpoint of storage space, container transportation problems, extra equipment and manpower requirements.

Thin-walled sausage shaped sections of tubular film up to about 6 mils thickness have been produced with the filling and forming operation taking place at about the same time. The drawback using this arrangement lies in the fact that the filled tubing does not stack properly and in addition there is a limit to the load an individual tube can carry. Also, the puncture resistance of the tube is fairly low compared with thick-walled material and this further limits its potential. Consequently, these types of tubular containers have not gained wide commercial acceptance and adaptations of this equipment to thick-walled containers have been commercially unsuccessful.

With this background in mind, it is an object of the present invention to provide an apparatus and method for continuously molding plastic containers.

Another object is to provide an apparatus and process adapted to form and fill containers in one operation.

Another object is to provide a two stage process for forming a container.

Another object is to provide a new extrusion nozzle particularly adapted to inject container forming fluid and a product into the container in timed sequence.

Another object is to provide a new mold handling and conveying process and apparatus.

Another object is to provide an apparatus and process adapted to form and fill containers with a minimum of manual handling.

With these objects in mind, the invention is illustrated by the diagrams in which:

FIGS. 6 and 7 are sectional side elevations of the molds on the bands and some elements of the pushing and pulling arms.

FIG. 8 is a plan view of FIG. 6 taken along lines 8—8.

FIG. 9 is a side elevation of the extrusion nozzle in axial section.

FIG. 11 is a schematic view of the various sequences in the blow molding cycle.

THE EXTRUDER

Figure 1:
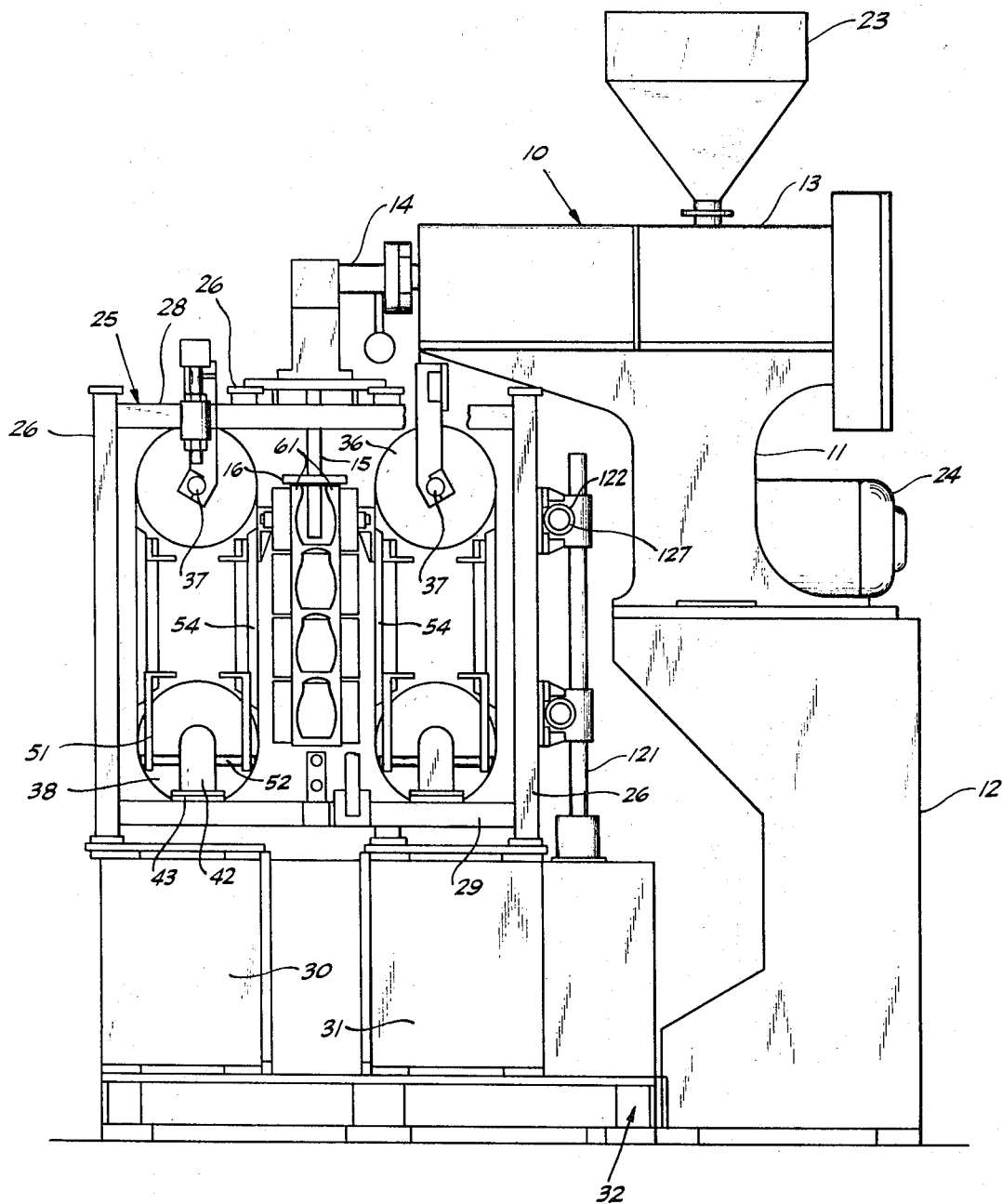
FIG. 1 is sectional side elevation view of the extruder, showing the molds and mold bands employed with the apparatus.

In the drawings, FIG. 1 shows a plastic extruder 10 mounted on a pedestal stand 11 which rests on a base 12. The extruder is conventional insofar as it is adapted to extrude resin as a tubular parison. The extruder is provided with a barrel 13, adapter 14 and extrusion nozzle 15 extending downwardly from the adapter. A Teflon faced seal plate 16 is positioned on the nozzle near its end and is spring biased against upwards motion. A resin feed hopper 23 for the extruder is mounted on the barrel 13, and power for rotating the extruder screw is supplied from a motor 24 attached to the base 12.

THE BAND FRAME, BANDS AND MOLD HOLDERS

The band frame of the apparatus shown in FIG. 1 is carried by a frame 25 having vertical beams 26, 27 (FIG. 7) and horizontal upper and lower beams 28 and 29, respectively. The frame is mounted on support blocks 30 and 31 which in turn rest on a support frame 32 lying on a solid foundation such as a concrete floor.

Figure 2:
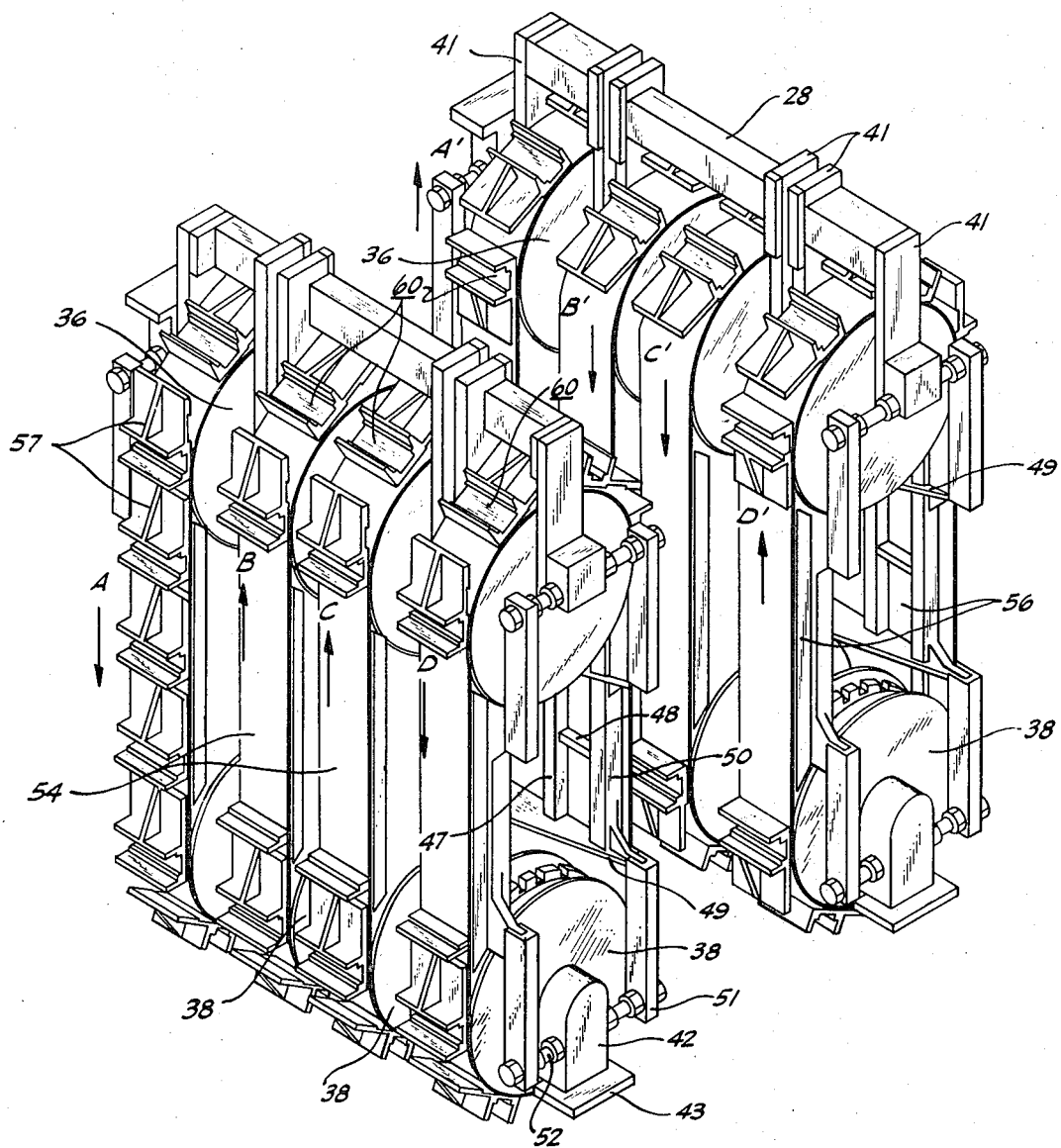
FIG. 2 is a perspective view of the mold bands.

The mold band assembly is shown in greater detail in FIGS. 2 and 6, and provides two opposed sets each of four upper idler sprocket drums 36 rotatable about idler shafts 37, and lower driving sprocket drums 38 rotatable about band drive shafts 39. The idler shafts 37 are supported from the horizontal beam 28 by vertically dependent brackets 41. The bearings for the band drive shafts 39 are contained and supported in housings 42 which are mounted on pedestals 43. Each idler and driving drum pair is given rigidity by frame elements 47, 48 attached to horizontal plates 49 and angle bars 50, respectively. The plates 49 are connected to the vertical angle bars mounted on posts 51, each post being connected to horizontal rods 52 extending from the gear housing 42.

Rotatably driven by each set of drums in the direction shown by the arrows are endless conveyor bands 54 labelled A, B, C, D, $A^1$, $B^1$, $C^1$ and $D^1$ as shown in FIG. 2. The outer conveyor bands are A, $A^1$, D, $D^1$ and the inner conveyor bands are B, $B^1$, C, $C^1$. The driving and idler drums are notched and drive the bands by means of lugs 55 which are mounted on the bands and which engage the grooves. Each band bears a plurality of mold holders 57 adapted to retain mold halves 58 and 59 thereon. The bands are supported on platens 56 which are reinforced by the frame elements 47 and 48. The mold holders provide parallel guides comprising horizontally aligned channels 60 for engaging the molds, and because the driving drums and bands are keyed together, the channels are maintained in alignment. When the individual mold halves are moved into a closed position as will be described, they are driven along the aligned channels.

THE MOLDS AND LOCKING MECHANISM

Figure 3:
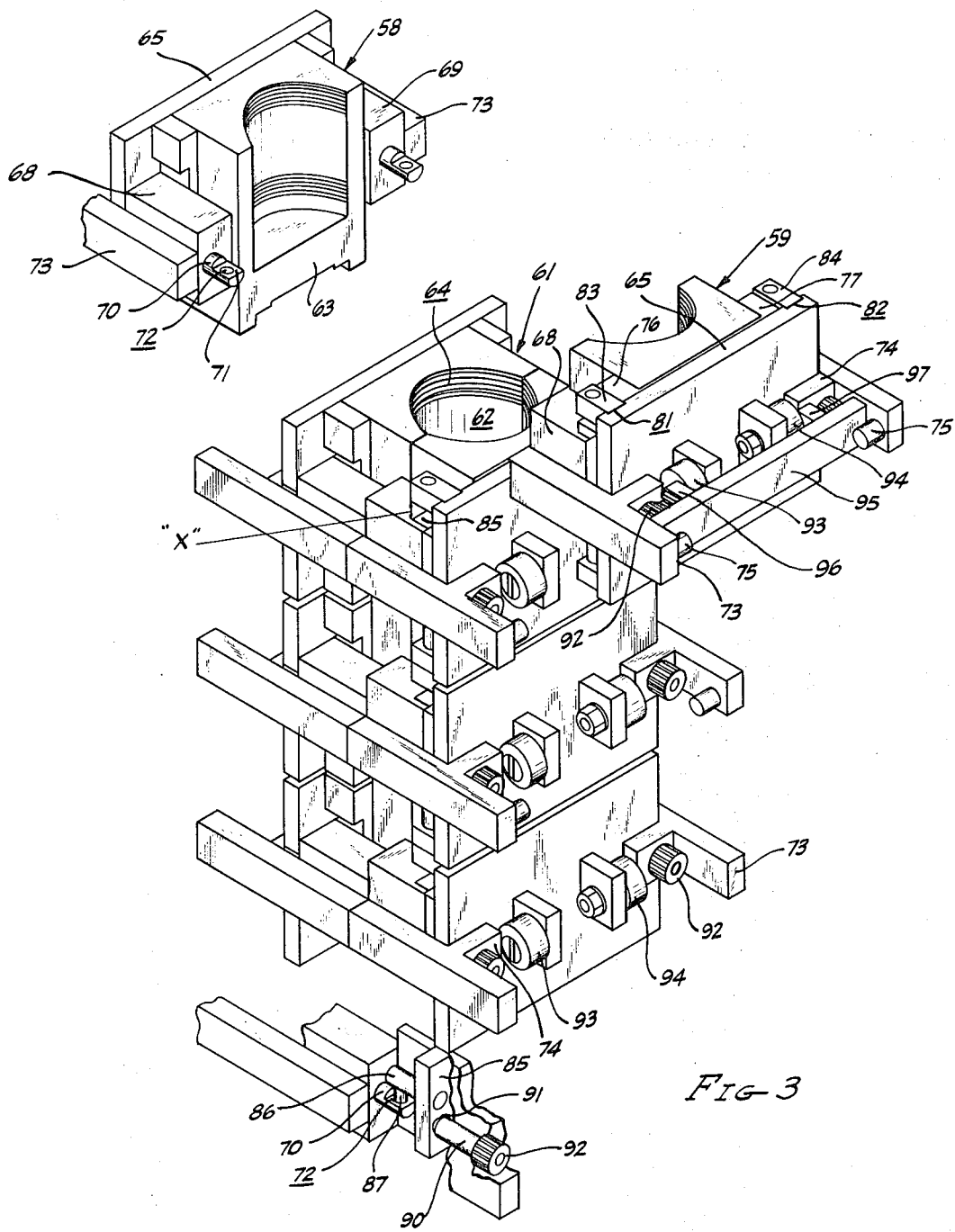
FIG. 3 is a perspective view of the molds showing their orientation in the molding cycle and showing details of the mechanism for locking them together.

The mold halves are shown in greater detail in FIG. 3 and comprise mold shells 61 formed internally to define a shaped cavity 62 when each half is brought together. The shape of the cavity is such as to provide a tight closure face 63 at the bottom of the mold and an open portion 64 at the top of the mold. The mold is filled through the open portion with thermoplastic and product. The positioning of the mold halves shown in FIG. 3 represents their location on the bands during a cycle of blow molding. The separated mold halves at the top are carried by bands A, A$^1$, D, D$^1$ while the mold halves in the closed position are carried by bands B, B$^1$, C, C$^1$. Mold 58 carried by bands A, A$^1$ are provided with a plate 65 on its rear face to which are attached stud holding blocks 68, 69. Receiving studs 70 are attached to the blocks, are semicircular in shape, and have a flat face 71 which provides a recess 72. The ends of plate 65 and the sides of stud holding block 69 are flush to provide an even surface upon which are mounted channel sliders 73. The channel sliders are retained by and slide along the channels 60 of the mold holders 57. It will be obvious that the function of the guides 60 and sliders 73 could be reversed, that is, the guides 60 could be sliders and the sliders 73 could be channels. The present arrangement is preferred because it provides a more rugged construction. As shown on mold half 59, the channel sliders extend rearwardly beyond the mold plate 65, and inwardly directed extensions 74 and inwardly directed studs 75 are carried by the slider.

The mold halves as shown on bands D, D$^1$ have vertical spacers 76, 77 at the side of the mold and shallow depressions 81, 82 are provided adjacent, and parallel to, the spacers.

Right-angled stops 83 and 84 are mounted in the depressions with the upper side of the top portion about even with the top of the mold plate 65. Stud holding block 68 is provided with a cavity within which a pin block 85 reciprocates. The length of the reciprocation is indicated as "x," the upper limit of reciprocation being determined by the position of the lower sides of the right angled stops 83, 84. The pin block is provided with a horizontally extending circular rod 86 from which is downwardly attached an engaging pin 87. This pin is adapted to fit into the recess 72 of receiving stud 70; this is best shown in FIG. 3 at the bottom of bands C, C$^1$. Alternately the engaging pin could be mounted on the flat face 71 and the recess could be provided on pin block 85.

Rotatable rods 90 each having an eccentric 91 at one end, and a gear 92 at the other end are mounted through the extension 74 and into the pin block 85. When the gear 92 is rotated, the eccentric 91 will contact and reciprocate the pin block 85; this will either lower the engaging pins 87 and lock them into the recesses 72 or raise and unlock the pins.

Roller bearings 93, 94 are mounted on the back of the mold plates 65 and a horizontally moveable rack 95 is shown positioned within the channels sliders 73 for rolling contact with the roller bearings. The racks are adapted to bear against the studs 75 to enable the racks to separate the mold halves when they are pulled outwardly. Stationary gear elements 96, 97 are mounted on the rack and individually engage the gears 92.

BAND DRIVE AND GEAR RACK ACTUATION MECHANISM

Figure 4:
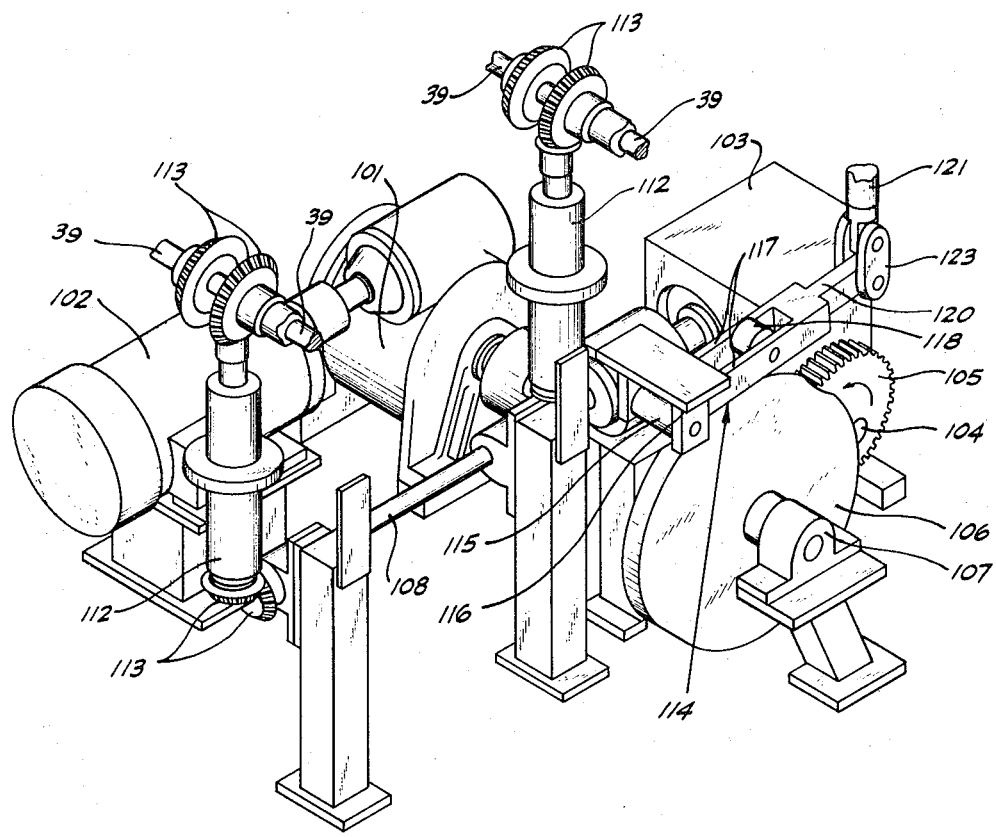
FIG. 4 is a perspective view of the band drive and the cam drive assembly for actuating the gear racks and driving the bands.

The mechanism for driving the bands and transferring the molds from their position on the outer sets of bands, A, A$^1$ and D, D$^1$ to the inner set of bands B, B$^1$ and C, C$^1$ and vice versa is best illustrated in FIG. 4. The mechanism includes a gear reduction box 101 powered by a D.C. motor 102. The gear box operates an intermittent drive 103 which in turn powers a horizontal output shaft 104 which carries a spur gear 105. An eccentric cam 106, is mounted on a pillow block 107 and carries a gear (not shown) which mates with the spur gear 105. An output shaft 108 from the intermittent drive 103, rotates vertical shafts 112 which powers the band drive shafts 39 through bevel gears 113.

Positioned above the cam is a cam follower assembly 114, one end of which has a pin 115 rotatably mounted within a bracket 116. A pair of lever arms 117 are attached to the pin and a cam roller 118 is carried between the lever arms. The other end of the cam follower assembly terminates in a single arm 120; a gear rack 121 having gear ridges 122 is reciprocally mounted to the arm 120 by a swivel link 123. For complicated sequencing operations, the gear rack 121 may be operated independently in two sections, each section being driven by a separate cam, or by a drive operating independently of the cam. For convenience of illustration, the transfer mechanism is only shown operating one gear rack.

PUSHING ARMS AND PULLING ARM MECHANISM

Figure 5:
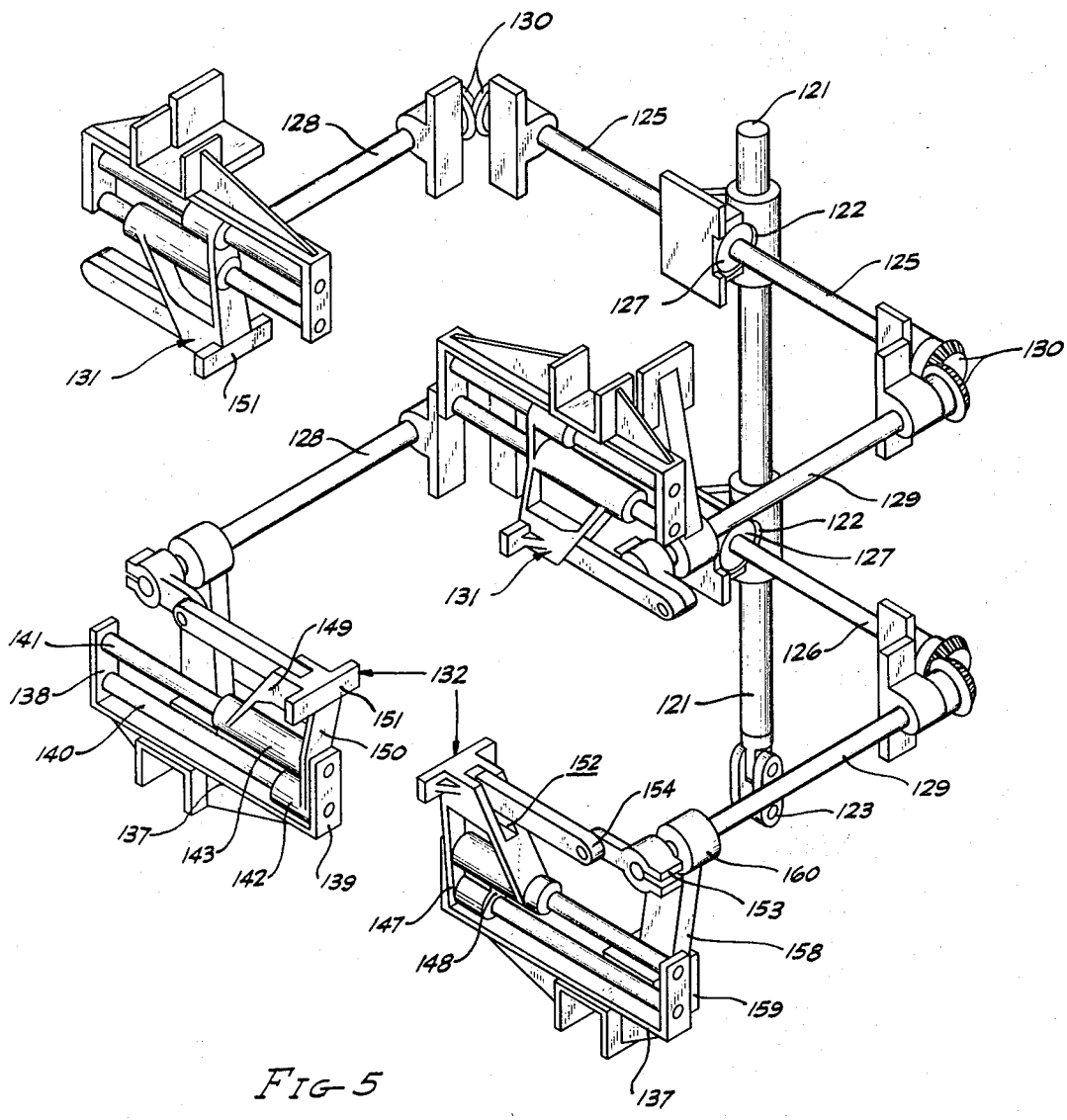
FIG. 5 is a perspective view of the gear rack with associated pushing and pulling arms.

The mechanism for driving the individual mold halves from the outer A, A$^1$, D, D$^1$ band positions to the inner band positions, B, B$^1$, C, C$^1$ and pulling them back out again is shown in FIG. 5. The mechanism includes upper and lower horizontal primary drive shafts 125, 126 connected through bevel gears 127, to the gear ridges 122 on the gear rack 121. The primary drive shafts 125, 126 rotate secondary shafts 128, 129 through bevel gears 130. The correct correlation between pushing and pulling is attained through use of left and right hand gears. Each secondary drive shaft 128 and 129 supports and actuates upper mold pushing arms 131 and lower mold pulling arms 132, these elements functioning to drive the mold halves together and pull them apart again. The upper arms 131 are of identical structure to lower arms 132 but are inverted in orientation. Each pushing and pulling arm 131, 132 provides a holding bracket having an elongate base 137 and connecting retainer ends 138, 139. Dual parallel rods 140, 141 are mounted between the retainer ends. Reciprocally mounted along the rods 140, 141 respectively are guide bushing 142 and drive bushing 143, both bushings being interconnected by plates 147 and 148. The forward and rear ends of the drive bushing 143 are connected through bridging elements 149, 150 to a driving head 151, the rear portion of which defines a recess 152. Each driving head 151 mounts an individual rack 95. Reciprocating motion for each drive bushing is provided by a lever 153 eccentrically mounted at the end of the secondary shafts 128, 129 and connected to one end of a link 154. The other end of the link is mounted within the recess 152.

The lower elements 137 support the secondary shafts 128, 129 by a bracket 158 which at one end is attached to the base 137 by a connecting element 159, and at the other end mounts the secondary shaft through a race assembly 160.

EXTRUDER NOZZLE

The novel extruder nozzle 15 of this invention is shown in detail in FIG. 9 and comprises a connecting ring 164 threaded to the exterior of the adapter 14, the ring defining a channel 165 which communicates with the interior of the adapter. An outer mandrel 166 having an inner tube 167 is downwardly bolted to the connecting ring.

The inner tube 167 has a channel bore 168 which registers with channel 165; channel 168 feeds into an annular channel 169 through a helical trough 171. Use of the helical trought provides an even feed of polymer from channel 168 to the annular channel 169. The channel 169 defines an homogenizing constriction 172, which is optional.

The inner tube is provided with a central tube 174 having an exposed portion 175 and air is forced into the central tube by way of connecting intake line 176.

A reinforcing tube 177 is carried by the central tube 174 and a product feed tube 178 having an intake line 179, is spaced from the reinforcing tube to form a channel 180. An outwardly flared portion 181 at the outlet to the channel 180 functions to reduce the pressure of the product leaving the tube. The inner tube 167 is spaced outwardly from the product feed tube 178 and provides annular air vent tube 182 which has an outlet port 183. Bores 184 and 185 are provided in the inner tube to vent air from the molds into the air vent tube while the container is filled.

A nozzle head 189 is mounted on the exposed portion 175 of the central tube 174. One end of the nozzle head provides a recess 190 and the other end of the nozzle head is a tubular wall 191 provided with exit ports 192. An annular space 193 is defined between the end of the inner tube 167 and the tubular wall 191. The annular space communicates with the outwardly flared portion 181 of the product feed tube 178. A cap 194 is mounted on the wall 191 and on the end of the inner tube 167. The cap defines an orifice 195 and provides a valve seat 196. A plug 200 provided with a central axial bore is mounted along the bore on the exposed portion 175 of the central tube 174. The outer body 202 of the plug makes a sliding fit with the tubular wall 191 of the nozzle head 189 and the body is cut away from wall 191 to define a passageway 203 which leads from exit ports 192. The end of the plug provides an annular wall 204, defining an expansion chamber 205; the end of the wall 204a is lapped to permit it to rest on the valve seat 196 of cap 194 and form a closure. An air bleed bore 206 is provided in the plug, the bore extending from the expansion chamber 205 to the end of the plug. A spring 207 positioned in recess 190, biases the plug outwardly against valve seat 195 to maintain the orifice 195 of the cap normally closed. In this closed position, as shown in FIG. 9, a space 210 is defined between the plug and nozzle head and the air bleed bore 206 permits air to escape from the space 210 into the mold during reciprocation of plug 200.

Figure 10:
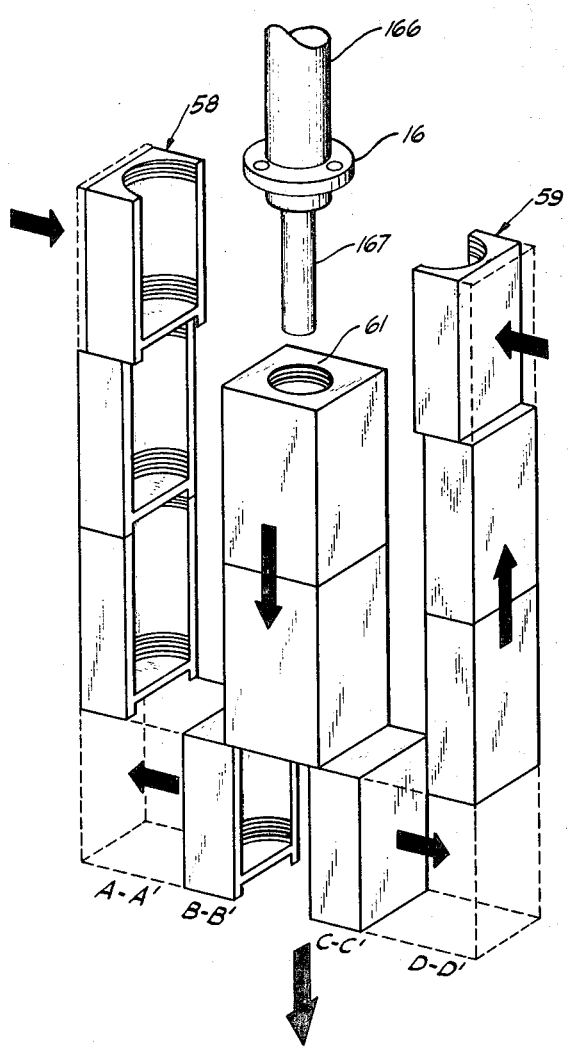
FIG. 10 is a perspective schematic view showing the movement of the molds during the molding times.

(1) OPERATION OF THE MOLDING UNIT BAND AND GEAR RACK DRIVE (a) Motion of the bands and attached molds:

Referring to FIG. 4, power for rotating the band drive shafts 39 is supplied from the intermittent drive 103 which rotates vertical shafts 112 through the bevel gears 113 to which the band drive shafts 39 are attached. The band drive shafts rotate the driving drums 38 and cause the bands 54 to rotate and to also rotate idler drums 36. The direction of movement of the mold halves 58, 59 mounted on the bands 54 (labelled A, A¹, D, D¹) is illustrated in FIGS. 2 and 10. The mold halves travelling on the outer bands A, A¹, D, D¹ move upwardly, and are then transferred horizontally along mold channels 60 to the interior bands B, B¹, C, C¹ where they are united and locked together.

The mold units are united about a molten parison to form a container, which is then filled with product; the molds then are moved downwardly while the container cools. The molds on bands B, B¹, C, C¹ are then pulled away from the container and outwardly transferred to bands A, A¹, D, D¹. The filled container will drop into a basket or conveyor belt and is eventually removed.

(b) Operation of the gear racks:

The gear rack 121 shown in FIGS. 4 and 5 is actuated intermittently during the molding cycle and the intermittent movement is produced by rotation of the cam 106 which contacts the cam roller 118 of the cam follower assembly 114. This contact will cause the cam follower assembly to be raised and lowered at periodic intervals which in turn will vertically actuate the gear rack 121 through the link 123. The rotation of the band drive shafts 39 is also intermittent, and the timing is adjusted so that when the gear rack is actuated, the band drive movement is just terminating and vice versa.

(c) Operation of the pushing arms:

FIGS. 3 and 5 illustrate the functioning of the upper and lower arms 131, 132 and the locking of the mold halves together. Commencing with the mold halves 58, 59 in the uppermost position, i.e., carried by bands A, A¹, D, D¹, the closing and locking operation is a follows:

The band drive shafts 39 are stopped due to the timing of the intermittent drive 103, and the gear rack 121 is actuated vertically. This will rotate the gears 127 which mate with gear ridges 122 on the gear rack to thereby rotate shafts 125, 126, 128 and 129. The inward motion of arms 131 is produced by rotation of the eccentric levers 153 which thereupon reciprocate the attached links 154. The reciprocating motion moves the bushings 142, 143 along their respective rods 140, 141 and forces drive heads 151 and attached racks 95 inwardly.

(d) Operation of the mold latching mechanism:

(i) Locking.—Referring to FIGS. 3 and 5, when the racks 95 contact the roller bearings 93 and 94, the mold halves are moved inwardly together on bands B, B¹, C, C¹ as the channel sliders 73 on the molds are driven along channels 60 on mold holders 57. The closed mold halves then travel downwardly through the distance "x" during which time pressure is continually applied by the drive heads 151 through the racks 95; this pressure maintains the mold halves tightly united prior to the molds locking together. Since the racks are stationary, gears 92 are rotated against the stationary gears 96, 97 and consequently pin blocks 85 will be lowered downwardly. The engaging pin 87 carried by each pin block will accordingly be lowered into recess 72 on the flat face 71 of receiving stud 70, thus locking the two mold halves 58, 59 together. When the locking action is completed the gear rack is actuated and the upper drive heads 151 are withdrawn.

(ii) Unlocking.—When a pair of locked mold halves 58, 59 arrive at the lower position on bands B, B¹, C, C¹ as shown in FIGS. 3 and 10, the racks 95 mounting the stationary gears 96 and 97 remain stationary, while the mold travels downwardly through the short distance "x." This causes gears 92 to be rotated and unlock the mold. The lower drive heads 151 then are actuated against the studs 75 to pull the molds apart and transfer them outwardly to bands A, A¹, D, D¹.

(2) OPERATION OF INJECTION NOZZLE (a) Parison formation.—FIG. 9 shows a molten flow of a polymer 211 such as polyethylene as it emerges from the adapter 14 mounted at the end of the extruder 10. The polymer flows into channel 165 in connecting ring 164. The polymer then flows through the homogenizing condition 172 and along the tube until it emerges into the mold cavity 62 as an unsupported molten tubular parison 212. Conventional heating means (not shown) may be provided in the nozzle to maintain the polymer in a molten condition or at an elevated temperature.

(b) Product flow.—Referring again to FIG. 9, a product 213 which may be a fluid, paste, etc., is fed through the intake line 179 and down the channel 180. When the product enters the flared out portion 181 the product velocity will be reduced. The product then enters the space 193 between the end of the inner tube 167 and the tubular wall 191 of the nozzle head 189. After entering the space 193, the product 213 flows through the exit ports 192 and fills passageway 203. When the spring 207 is in the outwardly biasing position, as shown in FIG. 9, the end of annular wall 204a of plug 200 will be seated against valve seat 196. Consequently, no product will flow from the end of passageway 203. At an appropriate time in the cycle, a metered volume of product is forced into the intake line 179 and pressures the plug upwardly against the biasing of spring 207. This permits the product to flow out through the orifice 195; when the metering pressure ceases, the plug reseats and the supply of product is cut off.

(c) *Air blowing.*—The downward biasing of seal plate 16 which covers and seals the open portion 64 of the mold, permits air to be pressurized into the parison contained in the cavity 62. The air is blown along intake line 176 and down the central tube 174 to force and pressure the parison against the mold walls and form a container.

(3) CONTAINER FORMING AND FILLING CYCLE

Sequence 1.—When the individual mold halves 58, 59 arrive at the upper position on the outer bands, A, A¹, D, D¹ as shown in FIGS. 10 and 11, the band motion is stopped and the mold halves are driven inwardly by the racks 95 on to the now stationary inner bands B, B¹, C, C¹. The biasing of the seal plate 16 against the top of the molds produces an air tight closure. The mold halves form a closure 217 around the open end of the parison which extends to the bottom of the mold while the upper pushing arms 131, drive heads 151 and racks 95 are kept in the inward driving position to maintain the mold halves closed.

Sequence 2.—With the bands still stationary, air pressure is applied through the central tube 174 to force the parison outwardly against the mold wall and form the major portion (i.e., all except the top) of it into a container 214. The mold halves completely close about the parison to seal and sever it from the succeeding filled container. The pressurized air in the newly formed container will then vent through bores 184, 185 and out the air vent tube 182.

Sequence 3.—The product pressure is then applied until the plug 200 is unseated from the valve seat 195 of the cap 194 thereby permitting product 213 to commence flowing into the container. The bands B, B¹, C, C¹ are now moved downwardly while the mold halves are locked and upper pushing arms 131 are reciprocated outwardly. To minimize splashing, the rate of product injection into the container is timed with the downward rate of motion of the mold to maintain a constant distance between the end of the nozzle 15 and the level of the liquid.

Sequence 4.—The filling of product into the container 214 terminates and the mold moves downwardly until it clears the nozzle 15 and a new space is provided for succeeding mold halves.

Sequence 5.—The mold is cleared free from the nozzle and the bands B, B¹, C, C¹ are stopped. Another set of mold halves 215, 216 then begin their closure about the nozzle which is now surrounded by a fresh length of parison.

Sequence 6.—The mold halves 215 and 216 are now almost closed about the parison causing the top of the container 214 to be partially closed; a blast of air then shapes remaining portion (i.e., the top) of the container 214 and commences to expand the parison in mold halves 215 and 216. The molds continue to close, seal and sever the end 218 of the container 214 in one motion. At this point the cycle becomes Sequence 1.

It will be apparent that the two stage process of forming a container by first pressure expanding a major portion of the container and in another sequence pressure expanding the remaining portion of the container can be employed in similar types of equipment and is not solely dependent on the apparatus of the present invention.

The present invention provides an apparatus and method for producing a container and filling it in one operation without requiring two separate facilities. This is less expensive from the standpoint of additional equipment and plant, and is also less expensive from the standpoint of maintenance, operating expenses and labor charges.

The apparatus is sufficiently flexible in design to produce empty containers by simply eliminating the product filling sequences if desired. It will also be evident that the container may be formed using fluid product pressure alone or in combination with the air pressure by means of changing the filling and air pressurizing sequences.

Furthermore, the possibility of product contamination is reduced significantly since the bottling and capping stages of the filling process have been completely eliminated. It will also be appreciated that a container unscrambling step prior to bottling has also been obviated by the apparatus of the present invention.

What is claimed is:

1. An apparatus for the continuous blow molding of containers which comprises:
   (1) an extrusion nozzle supported and adapted to deliver a downwardly moving thermoplastic parison;
   (2) a pair of inner vertical conveyers supported on opposite sides of and generally below said nozzle, and adapted to convey between them united mold halves downwardly from said nozzle;
   (3) outer vertical elevators positioned on each side of said pair of inner vertical conveyers, each elevator being adapted to convey upwardly a plurality of inwardly facing mold halves in a path adjacent and parallel to the path of the descending united mold halves between said inner conveyers;
   (4) means for horizontally transferring mating mold halves from near the tops of said outer elevators to said inner conveyers;
   (5) means for uniting the transferred mold halves about said parison;
   (6) conduit means carried by said nozzle for pressuring gas into the parison against the united molds to form a container; and
   (7) means for horizontally transferring united mold halves near the bottom of said inner conveyers to opposite positions on said outer elevators, thereby releasing the enclosed container.

2. An apparatus as defined in claim 1 in which said extrusion nozzle is provided with a plurality of conduits for separately delivering pressurized gas for expanding the parison into a container, for delivering a liquid product to the resulting container, and for venting gas from the container during filling.

3. An apparatus as defined in claim 1 wherein said pair of inner vertical conveyers comprises paired endless bands facing each other and carrying horizontally aligned mold holders, and mounted on spaced, axially parallel driving drums.

4. An apparatus as defined in claim 3 wherein each of said outer vertical elevators comprises a pair of endless bands facing each other and carrying horizontally aligned mold holders, and mounted on spaced, axially parallel driving drums.

5. An apparatus as defined in claim 1 including a common drive source for actuating said elevator driving drums and said inner vertical conveyer driving drums.

References Cited

UNITED STATES PATENTS

| 2,790,994 | 5/1957 | Cardot et al. | 18—5 X |
| 3,035,302 | 5/1962 | Lysobey | 18—5 X |
| 3,099,043 | 7/1963 | Held | 18—5 X |
| 3,288,317 | 11/1966 | Wiley | 18—5 X |
| 3,310,620 | 3/1967 | Martelli et al. | 18—5 X |
| 3,328,837 | 7/1967 | Moran | 53—140 X |
| 3,331,902 | 7/1967 | Stark | 264—99 |
| 3,399,508 | 9/1968 | Frielingsdorf et al. | 18—5 X |

FOREIGN PATENTS 954,473    4/1964    Great Britain.

J. SPENCER OVERHOLSER, Primary Examiner

M. O. SUTTON, Assistant Examiner

U.S. Cl. X.R.

164—279: 264—99